United States Patent
Chalemin et al.

(10) Patent No.: US 8,364,826 B2
(45) Date of Patent: Jan. 29, 2013

(54) PROGRAMMATIC MESSAGE FORWARDING

(75) Inventors: Glen Edmond Chalemin, Austin, TX (US); Indran Naick, Cedar Park, TX (US); Clifford Jay Spinac, Austin, TX (US); Calvin Lui Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/348,101

(22) Filed: Jan. 2, 2009

(65) Prior Publication Data

US 2010/0174786 A1    Jul. 8, 2010

(51) Int. Cl.
*G06F 15/16* (2006.01)
*H04W 4/00* (2009.01)
*H04B 7/00* (2006.01)

(52) U.S. Cl. .................. 709/227; 455/422.1; 455/41.2

(58) Field of Classification Search .......... 709/204–207, 709/227
See application file for complete search history.

(56) References Cited

U.S. PATENT DOCUMENTS

| 6,668,173 | B2 | 12/2003 | Greene | |
|---|---|---|---|---|
| 6,934,380 | B2 | 8/2005 | Shaffer et al. | |
| 2003/0120805 | A1* | 6/2003 | Couts et al. | 709/238 |
| 2006/0176167 | A1* | 8/2006 | Dohrmann | 340/506 |
| 2006/0234631 | A1* | 10/2006 | Dieguez | 455/41.2 |
| 2007/0214222 | A1 | 9/2007 | Chang et al. | |
| 2008/0140794 | A1* | 6/2008 | Rybak | 709/207 |
| 2010/0069058 | A1* | 3/2010 | Rothschild | 455/422.1 |

* cited by examiner

*Primary Examiner* — Ashok Patel
*Assistant Examiner* — Evans Desrosiers
(74) *Attorney, Agent, or Firm* — Yee & Associates, P.C.; David Mims

(57) ABSTRACT

Illustrative embodiments present a computer-implemented method for programmatic message forwarding. The computer-implemented method initiates a messaging session on a primary device and identifies device priority preferences for a set of secondary devices. The computer-implemented method further monitors for a presence of the mobile device, wherein the presence of the mobile device is indicated as a heartbeat, and responsive to a determination of the absence of the heartbeat is detected, identifies one of the set of secondary devices as a target device, and responsive to locating the target device, forwards a message to the target device.

18 Claims, 4 Drawing Sheets

PROGRAMMATIC MESSAGE FORWARDING

BACKGROUND OF THE INVENTION

1. Field of the Invention

The present invention relates generally to an improved data processing system, and, more specifically, to a computer-implemented method, a data processing system, and a computer program product for programmatic message forwarding.

2. Description of the Related Art

Instant messaging or instant message (IM) tools are widely used by many people today. Instant message tools offer a variety of features and are available as products from many vendors, such as IBM® Lotus® Sametime®, available from International Business Machines Corporation, Yahoo! ®Messenger, available from Yahoo Incorporated and AOL Instant Messenger® (AIM), available from AOL LLC. Some of the services are available on mobile devices such as mobile phones and personal digital assistants (PDAs).

Currently, when a user is logged on to a computer using an instant message service and the user steps away from the computer, the instant message is displayed on the display screen, but is not seen by the user until the user returns. AOL Instant Messenger has a feature enabling instant message forwarding to be manually selected by the user. The drawback of this feature is that when the user steps away in a hurry, the user is not likely to select instant message forwarding. While the feature is available, the feature must be manually initiated which reduces the appeal and usefulness of the feature.

When the instant message is displayed without the user being at the display, an issue of privacy and security may result. Further, the user does not have the benefit of seeing the message when intended, which may have been the very purpose of the message.

BRIEF SUMMARY OF THE INVENTION

According to one embodiment of the present invention, a computer-implemented method for programmatic message forwarding is presented. The computer-implemented method initiates a messaging session on a primary device and identifies device priority preferences for a set of secondary devices. The computer-implemented method further monitors for a presence of the mobile device, wherein the presence of the mobile device is indicated as a heartbeat, and responsive to a determination that no heartbeat is detected, identifies one of the set of secondary devices as a target device, and responsive to locating the target device, forwards a message to the target device.

In another illustrative embodiment, a data processing system for programmatic message forwarding is presented. The data processing system comprises a bus, a memory connected to the bus, wherein the memory contains computer-executable instructions, a communications unit connected to the bus, a processor unit connected to the bus. The processor unit executes the computer-executable instructions to direct the data processing system to initiate a messaging session on a primary device, identify device priority preferences for a set of secondary devices, wherein the set of secondary devices includes a mobile device, monitor for a presence of the mobile device, wherein the presence of the mobile device is indicated as a heartbeat, responsive to a determination of the absence of the heartbeat, identify one of the set of secondary devices as a target device, and responsive to locating the target device, forward a message to the target device.

In another illustrative embodiment, a computer program product for programmatic message forwarding is provided. The computer program product comprises a computer usable medium having computer-executable instructions stored thereon. The computer-executable instructions comprises computer-executable instructions for initiating a messaging session on a primary device, computer-executable instructions for identifying device priority preferences for a set of secondary devices, wherein the set of secondary devices includes a mobile device, computer-executable instructions for monitoring for a presence of the mobile device, wherein the presence of the mobile device is indicated as a heartbeat, computer-executable instructions responsive to a determination of the absence of the heartbeat, for identifying one of the set of secondary devices as a target device, and computer-executable instructions responsive to locating the target device, for forwarding a message to the target device.

DETAILED DESCRIPTION OF THE INVENTION

Figure 1:
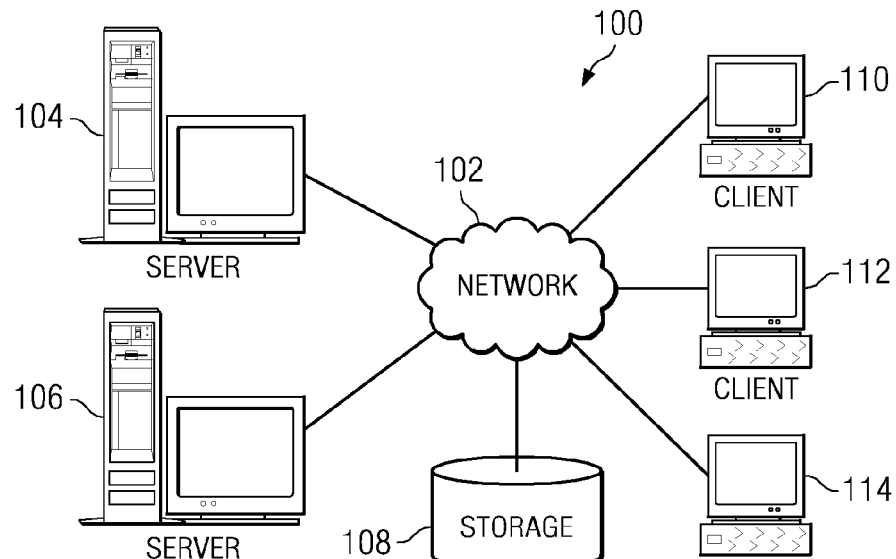
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 2:
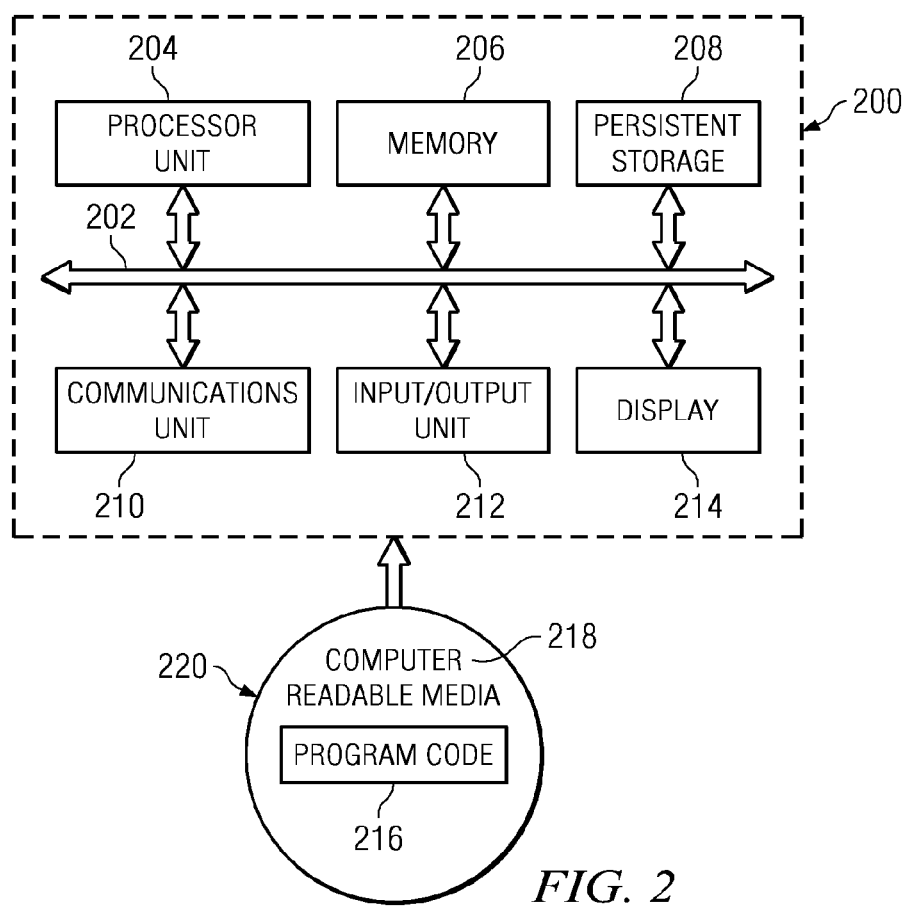
FIG. 2, is a block diagram of a data processing system in which illustrative embodiments may be implemented.

With reference now to the figures and in particular, FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer-recordable storage medium and downloaded to a data processing system, or other device, for use. For example, program code may be stored on a computer-recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

The instant message client and the mobile phone of the user use Bluetooth® wireless specification support, available from Bluetooth SIG, Inc., to communicate with each other. For example, using system 100 of FIG. 1, a mobile phone of a user of client 110 is known to the personal computer of client 110, which is running the instant message client, the number of the phone and potentially, an approved list of instant message recipients created by the user, whose messages should be forwarded. The message recipients may be those such as client 112 and client 114. Server 104 may be an instant message server supporting clients on network 102. A heartbeat exchange takes place on a defined, configurable interval, for example 10 seconds. If the personal computer of client 110 tries to reach the cell phone during one of the heartbeats and doesn't receive an answer, the instant message client on the personal computer of client 110 assumes the user has stepped away. Any instant messages that are received from a user on the approved list, such as client 112, would be automatically forwarded to the mobile device, such as the phone, via a standard short message system (SMS) message.

The capability allows the user to leave the user's desk in a hurry and still have the instant messages forwarded.

Once the user returns to the user's desk, the instant message client on the personal computer of client 110 and the user's phone can detect each other again. Upon detection the instant message service on the personal computer of client 110 automatically stops forwarding instant messages. The method allows the user to stay logged in on the personal computer and see the less important messages once the user returns, while the important messages are automatically forwarded to the user's phone.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 provides communications through the use of wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. Computer-readable media 218 also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
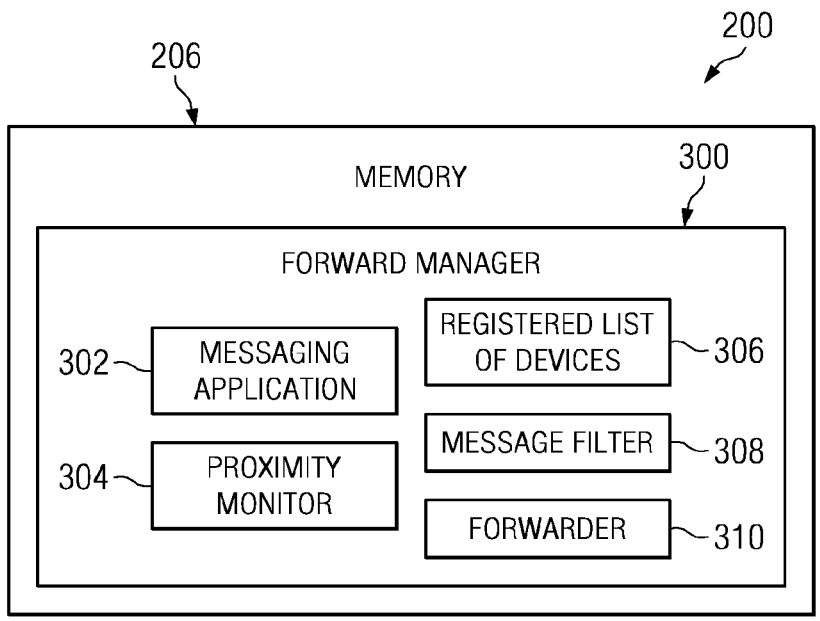
FIG. 3 is a block diagram of components of a forward manager, in accordance with illustrative embodiments.

With reference to FIG. 3, a block diagram of components of a forward manager, in accordance with illustrative embodiments, is shown. Forward manager 300 is shown within memory 206 of system 200 of FIG. 2, but may reside in other storage locations until required for use, such as storage 108 of system 100 of FIG. 1, or as program code 216 of system 200 of FIG. 2, prior to installation.

Forward manager 300 is a set of services, utilities or modules that may be implemented as a large block or as separate callable services as required. For example, each of the components listed may reside in separate memory locations ready for use or may be co-located within the memory of forward manager 300, and still provide the same level of function. Forward manager 300 provides a convenient package to support the services of the other components and provides a common focus for installation and maintenance operations, as well as common user interface support. Forward manager 300 may be implemented as an extension to an existing messaging service via application programming interfaces or as part of an enhanced messaging service.

Messaging application 302 is an instant messaging application as currently available. The application will be extended with addition of forward manager 300 services.

Proximity monitor 304 is a presence detector service. The service determines an awareness of the presence or absence of the user mobile devices, such as a mobile phone. For example, proximity monitor 304 may be configured to a specific user device, such as a Bluetooth signal of the user device. The presence of the user device causes a signal to be detected. The signal is referred to as a "heartbeat" informing proximity monitor 304 that the user is within a defined distance of the user workstation. The absence of such a "heartbeat" indicates the user has left the area of the workstation. When a user chooses not to use presence detection, such as when a mobile phone device is turned off, the service may be configured to stop presence detection.

Registered list of devices 306 comprises a defined set of devices to which instant messages should be forwarded. The list is configurable to allow specification of the target devices in a priority sequence. The capability allows a user to select only messages intended for specific devices, according to preference or capability.

Message filter 308 provides a capability to determine which messages to forward rather than have all or none forwarded. Filtering is typically applied based on sender, device, size and other typical parameters.

Forwarder 310 provides the capability to send the message to a desired target device, or another user. The other user may be a substitute for the original user when the original user has left the workstation. Forwarder 310 redirects the instant message according to the settings of message filter 308 and registered list of devices 306.

Figure 4:
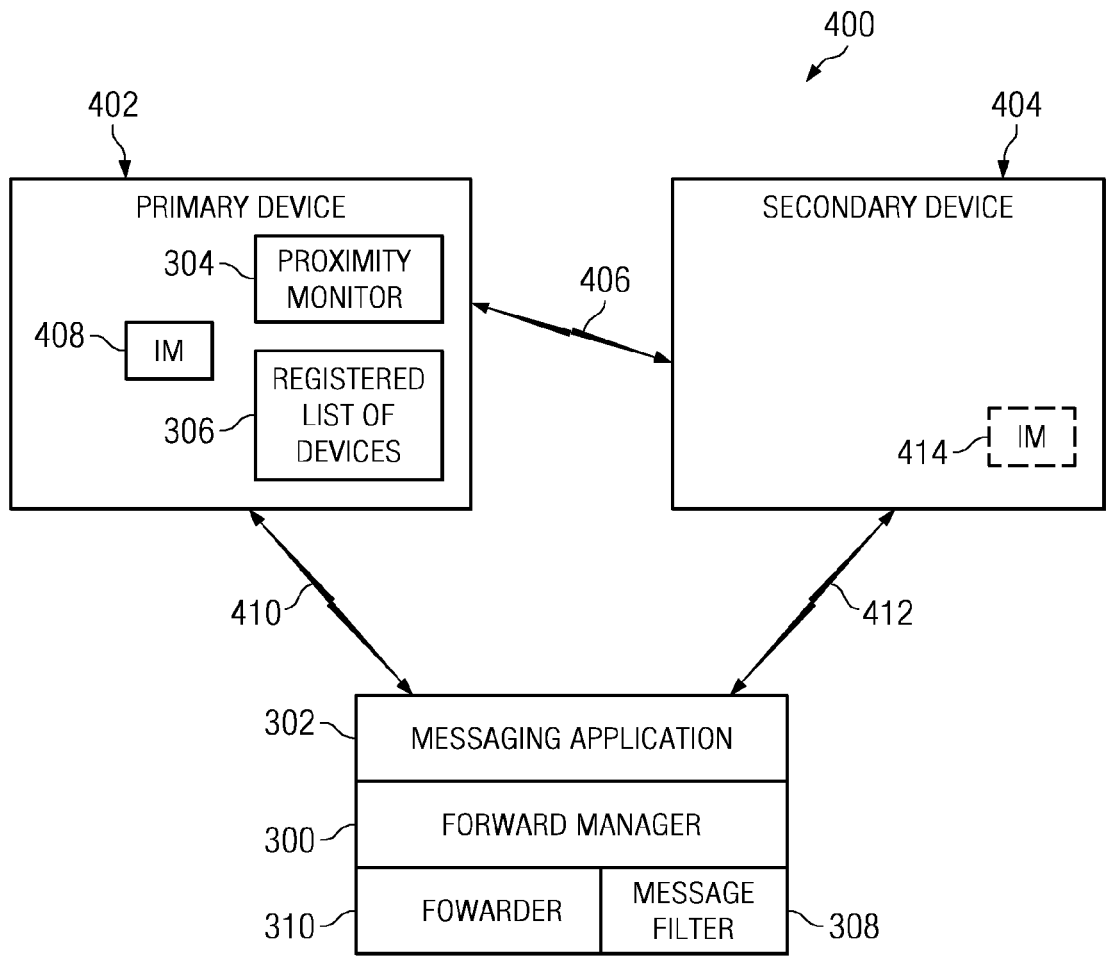
FIG. 4 is a block diagram of a primary and secondary operation view of the forward manager of FIG. 3, in accordance with illustrative embodiments.

With reference to FIG. 4 is a block diagram of a primary and secondary operation view using the forward manager of FIG. 3, in accordance with illustrative embodiments; is shown. The sequence provides an overview of the operation of detecting the presence and absence of the user at the workstation.

Primary device 402, which is typically a personal computer (PC), is depicted with an instant message IM 408 which has been received and displayed on primary device 402. Primary device 402 is further enhanced with additional components of proximity monitor 304 and registered list of devices 306. IM 408 is received from messaging application 302 over link 410 on primary device 402.

Another user device, such as a mobile device in the form of secondary device 404, is in communication with primary device 402 as noted by communication link 406. A "pairing" activity has occurred between the Bluetooth enabled mobile secondary device 404 and primary device 402, forming a "presence." Presence is detected between the pair of primary device 403 and secondary device 404 by proximity monitor 304. Proximity monitor 304 continuously monitors for a signal from secondary device 404. The signal may be referred to as a heartbeat. The absence of a heartbeat indicates the secondary device is no longer in the vicinity, as when the user has left primary device 402. One or more secondary devices may comprise a set of secondary devices from which one device is selected as an alternate for the primary device. Device selection is made from the registered list of devices 306.

In the illustrated scenario when communication between primary device 402 and the mobile device of secondary device 404 is maintained a message session may be referred to as a normal session on primary device 402. IM 408 will be displayed on primary device 402.

When there is no communication link 406 between primary device 402 and mobile secondary device 404. There is no instant message, IM 408 on workstation 402. A "heartbeat" is missing for the pairing of workstation 402 and mobile device 404. Therefore, the instant message (IM 408) has been transferred to mobile device 404 by forward manager 300 of FIG. 3 over link 412.

Instant message IM 414 is directed to the mobile device of secondary device 404. Forward manager 300 uses message filter 308 to determine whether the instant message should be forwarded. Not all messages are required to be forwarded. The user may request messages that meet specified criteria as having certain attributes such as priority, author, subject and other descriptive attributes be transferred.

In scenario 416, communication link 406 has been restored and proximity has been detected in the form of the "heartbeat." The instant message service has reverted to initial status with IM 408 now appearing on the personal computer, workstation 402. Presence detection of mobile device 404 caused forward manager 300 of FIG. 3 to revert to initial behavior and allow IM 408 to display on workstation 402.

Figure 5:
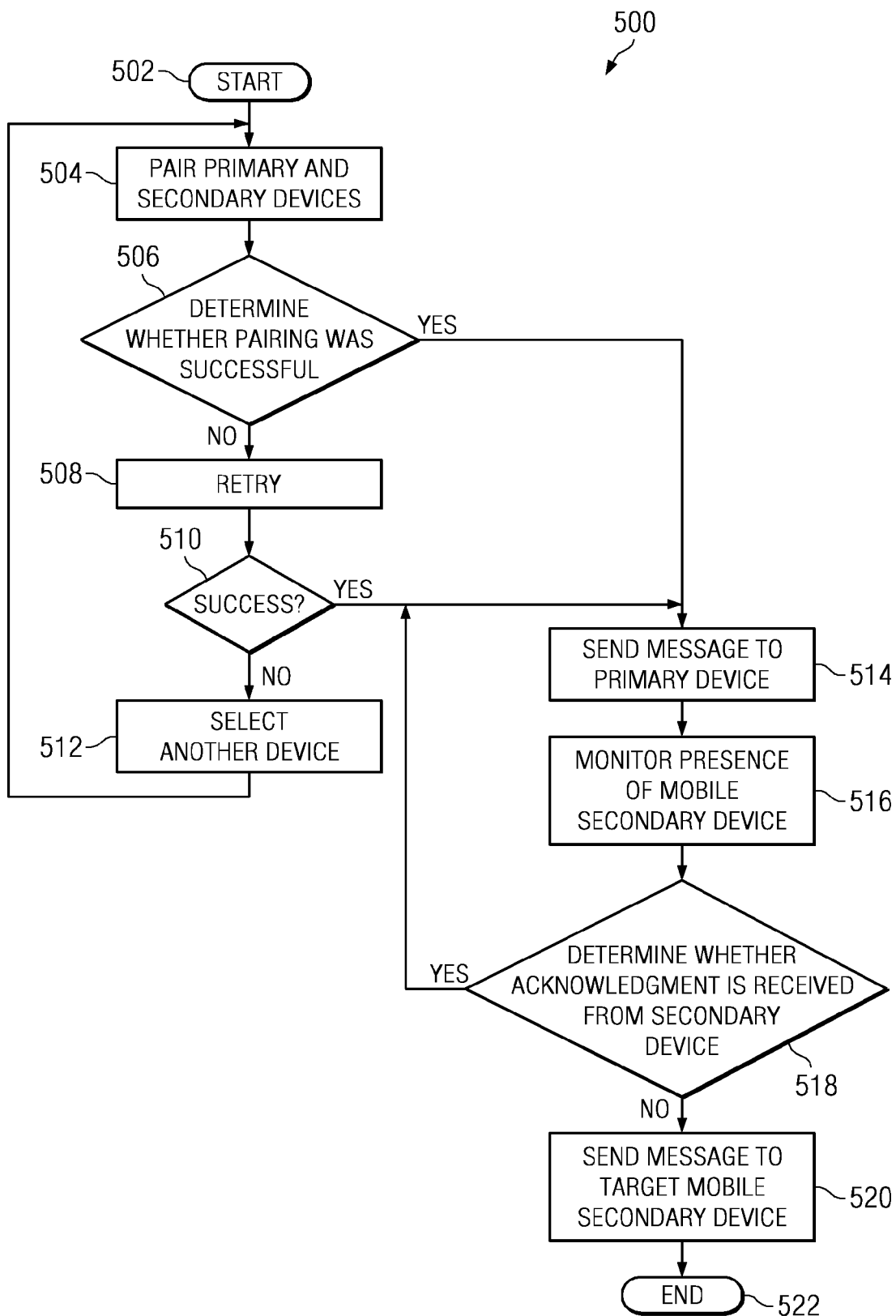
FIG. 5 is a flowchart of a process of initial setup and monitoring using the forward manager of FIG. 3, in accordance with illustrative embodiments.

With reference to FIG. 5, a flowchart of a process of initial setup and monitoring using the forward manager of FIG. 3, in accordance with illustrative embodiments is presented. Process 500 describes the initial primary and secondary device pairing operation as well as the presence detection of the secondary device.

Process 500 starts (step 502) and pairs the primary and secondary devices (step 504). The pairing in the example shown represents a Bluetooth pairing operation. A determination is made as to whether the pairing was successful (step 506). When the pairing is successful a "yes" result is obtained. When a pairing fails to occur, a "no" result is obtained. When a "no" is obtained in step 506, a retry occurs (step 508). A determination is made as to whether the retry was successful (step 510). When the retry is successful a "yes" result is obtained. When the retry is not successful a "no" result is obtained. When a "no" result is obtained in step 510, select another device is performed (step 512) with process 500 looping back to step 504. Another device may be used to attempt to pair with the primary device. The pairing is performed in the example with a Bluetooth protocol but other short range wireless protocols may also be used. When a "yes" is obtained in step 510, process 500 skips to step 514.

Send message to primary device (step 514) makes the instant message available on the primary device. The display of the message on the primary device is the typical mode of operation. Monitor presence of the mobile secondary device (step 516) is performed in a continuous manner to detect the presence or absence of the mobile device.

A determination is made as to whether an acknowledgement is received from the secondary device (step 518). When an acknowledgement is received, a "yes" result is obtained. When an acknowledgement is not received, a "no" result is obtained. When a "yes" is received in step 518, the secondary device is in close proximity with the primary device. When the devices are in close proximity the user is located within view of the primary device and messages are routed to the primary device. When a "no" result is obtained in step 518, send message to target mobile secondary device (step 520) is performed, with process 500 terminating thereafter (step 522).

In the illustrative example described, a pair of devices establishes a communication link. The communication link is used by the primary device to monitor for the presence of the mobile, secondary device. The presence when detected is referred to as a heartbeat.

Figure 6:
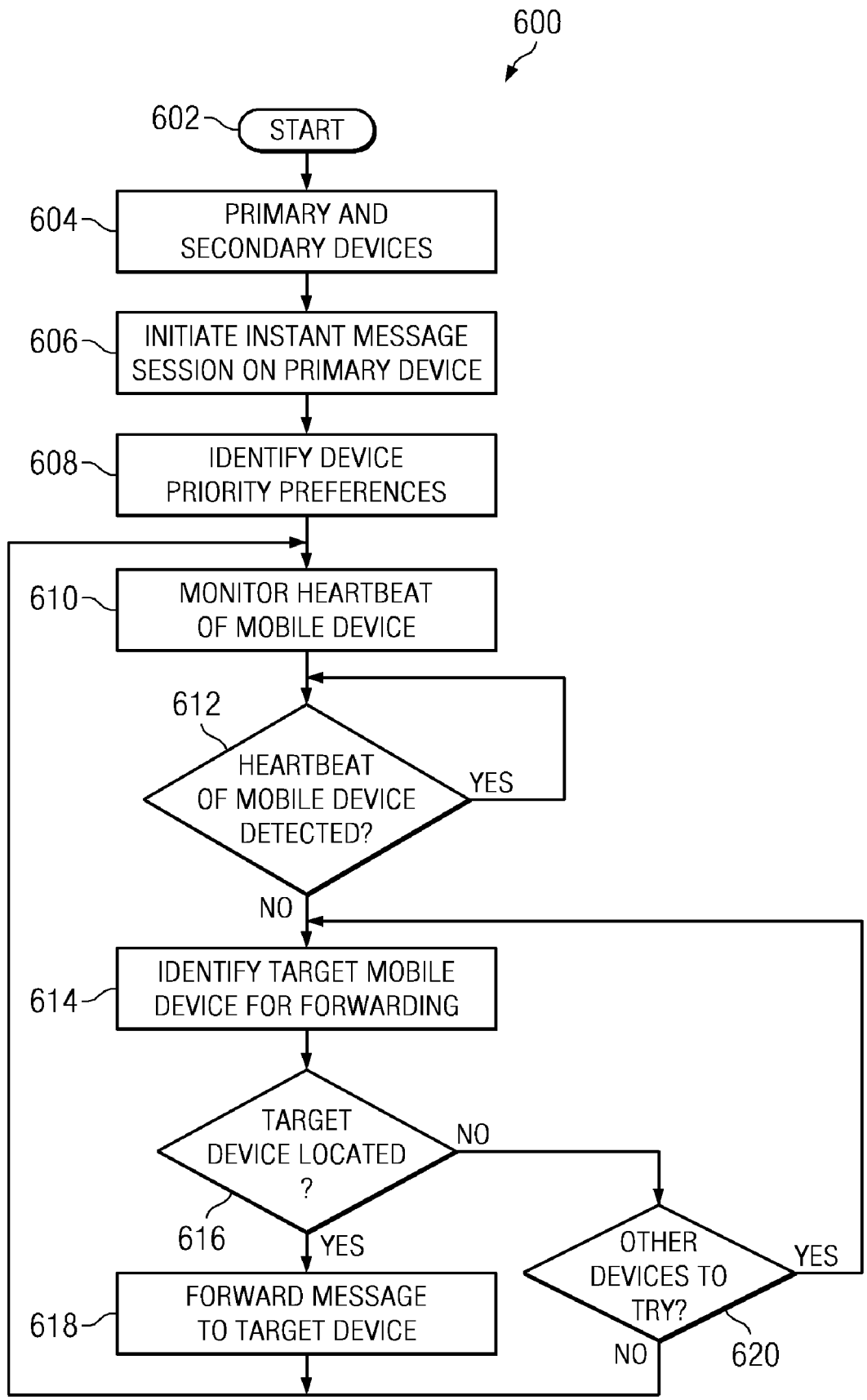
FIG. 6 is a flowchart of a message re-directing process using the forward manager of FIG. 3, in accordance with illustrative embodiments.

With reference to FIG. 6 is a flowchart of a message re-directing process using the forward manager of FIG. 3, in accordance with illustrative embodiments, is shown. Process 600 is an example of using forward manager 300 of FIG. 3.

Process 600 starts (step 602) and performs a pairing operation to pair the primary device and the mobile device that is one of a set of secondary devices (step 604). The pairing, for example, occurs when Bluetooth enabled devices are used, acknowledging the existence of the devices. If another short-range wireless protocol is used, the announcement and recognition of the device pairs must be handled in accordance with that protocol to allow presence detection of the mobile device to occur without user intervention. The set of secondary devices comprises one or more devices, including the mobile device. The mobile device is typically a cellular phone or a personal digital assistant.

Initiate instant message (IM) session on primary device occurs (step 606). In the normal mode of operation, the instant message appears on the display of the primary device during the instant message session. A user may be requested to provide input to define device priority preferences (step 608). Preferences may also be provided by a configuration file, property file or system defaults as required. Define preferences establishes a set of devices that may be used in the event a message is forwarded. The set of devices comprise an alternate selection of secondary devices as target devices to receive a message when the user is not located at the primary device.

Monitor heartbeat of mobile devices (step 610) occurs in which the mobile devices are polled to detect presence or absence of the mobile devices. A determination is made as to whether the heartbeat of the mobile device is detected (step 612). Responsive to a determination that a heartbeat is detected, a "yes" is obtained. When no heartbeat is obtained, a "no" results. When a "yes" is obtained in step 612, process 600 loops back to repeat step 612. When a "no" is obtained, identify target mobile device for forwarding is performed (step 614). A "no" result in step 612 indicates the user of the mobile device has left the proximity of the primary device.

A determination is made as to whether the target device is located (step 616). Responsive to the determination the target device is located; a "yes" result is obtained. Responsive to the determination the target device is not located, a "no" result is obtained. When a "yes" is obtained in step 616, forward message to target device is performed to re-direct the instant message to the alternate location (step 618). The instant message is forwarded based on filtering precedence of the primary device user. Process 600 loops back to step 610.

When a "no" is obtained in step 616, a determination is made as to whether there are other devices to try (step 620). When there are other devices to try, a "yes" is obtained. When there are no other devices to try, a "no" result is obtained. When a "yes" is obtained in step 620, process 600 loops back to step 614 to identify target mobile device for forwarding. When a "no" is obtained in step 620, process 600 loops back to step 610 to monitor again with the message displaying on the primary device.

Thus, illustrative embodiments present, by way of example, the capability of programmatic forwarding of messages intended for a primary device to a secondary device. In one illustrative embodiment, the method monitors the presence of a "heartbeat" of a mobile device. When the "heartbeat" is no longer detected, the method programmatically re-directs the message to the recipient user's mobile device. The mobile device may be one of a set of devices in a preferred order. Further, the method provides a capability to filter the messages to permit forwarding of a subset of original messages. The subset may be determined based on user defined preference including message sender, size of message, type of message or priority.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for programmatic message forwarding, the computer-implemented method comprising:
    initiating a messaging session on a primary device;
    identifying device priority preferences for a set of secondary devices, the set of secondary devices includes a mobile device;
    monitoring for a presence of the mobile device with the primary device, the mobile device is present with the primary device when the mobile device and the primary device are in close physical proximity to each other, the presence of the mobile device with the primary device is indicated as a heartbeat, and the heartbeat will be absent when the mobile device is not with the primary device;
    a presence of the mobile device with the primary device indicates that a user is with the primary device, and an absence of the heartbeat indicates that the user is not with the primary device;
    responsive to a determination of the absence of the heartbeat, identifying one of the set of secondary devices as a target device; and
    responsive to locating the target device, forwarding a message to the target device and;
    ordering each secondary device in the set of secondary devices according to a sequence in which the secondary device is to be selected to receive a forwarded message, the order is determined by one or more of a type of message, an origin of message, a size of message, and a secondary device capability.

2. The computer-implemented method of claim 1, wherein initiating a messaging session further comprises pairing the primary device with a mobile device in the set of secondary devices.

3. The computer-implemented method of claim 2, wherein pairing the primary device with a mobile device in the set of secondary devices further comprises:
    responsive to a determination that the pairing was unsuccessful, retrying the pairing;
    responsive to a determination that the retry was unsuccessful, selecting another device from the set of secondary devices.

4. The computer-implemented method of claim 1, wherein monitoring for the presence of a mobile device further comprises:
    determining whether the heartbeat of the mobile device is detected; and
    responsive to determining the heartbeat is detected, continuing to monitor for the presence of the mobile device.

5. The computer-implemented method of claim 1, wherein responsive to a determination of the absence of the heartbeat, identifying one of the set of secondary devices as a target device further comprises:
    selecting a first device, according to preference, from the set of secondary devices, to be the target device;
    determining whether the target device is located;
    responsive to a determination that the target device is not located, determining whether other secondary devices to try are available;
    responsive to a determination that there are no other secondary devices to try, continuing to monitor.

6. The computer-implemented method of claim 1, wherein forwarding a message to the target device further comprises:
    determining whether to forward the message according to predetermined filters applicable to message forwarding;
    responsive to the predetermined filters permitting the message to flow, forwarding the message; and
    continuing to monitor the heartbeat of the mobile device.

7. A data processing system for programmatic message forwarding, the data processing system comprising;
    a bus;
    a memory connected to the bus, the memory contains computer-executable instructions;
    a communications unit connected to the bus;

a processor unit connected to the bus, the processor unit executes the computer-executable instructions to direct the data processing system to:
initiate a messaging session on a primary device;
identify device priority preferences for a set of secondary devices, the set of secondary devices includes a mobile device;
monitor for a presence of the mobile device with the primary device, the mobile device is present with the primary device when the mobile device and the primary device are in close physical proximity to each other, the presence of the mobile device with the primary device is indicated as a heartbeat, and the heartbeat will be absent when the mobile device is not with the primary device;
a presence of the mobile device with the primary device indicates that a user is with the primary device, and an absence of the heartbeat indicates that the user is not with the primary device;
responsive to a determination of the absence of the heartbeat, identify one of the set of secondary devices as a target device; and
responsive to locating the target device, forward a message to the target device and;
ordering each secondary device in the set of secondary devices according to a sequence in which the secondary device is to be selected to receive a forwarded message, the order is determined by one or more of a type of message, an origin of message, a size of message, and a secondary device capability.

8. The data processing system of claim 7, wherein the processor unit executes the computer-executable instructions to direct the data processing system to initiate a messaging session further comprises:
pairing the primary device with a mobile device in the set of secondary devices.

9. The data processing system of claim 8, wherein the processor unit executes the computer-executable instructions to direct the data processing system to pair the primary device with a mobile device in the set of secondary devices further comprises:
responsive to a determination that the pairing was unsuccessful, retrying the pairing; and
responsive to a determination that the retry was unsuccessful, selecting another device from the set of secondary devices.

10. The data processing system of claim 7, wherein the processor unit executes the computer-executable instructions to direct the data processing system to monitor for the presence of a mobile device further comprises:
determining whether the heartbeat of the mobile device is detected; and
responsive to determining the heartbeat is detected, continuing to monitor for the presence of the mobile device.

11. The data processing system of claim 7, wherein the processor unit executes the computer-executable instructions to direct the data processing system to respond to a determination of the absence of the heartbeat, and identify one of the set of secondary devices as a target device further comprises:
select a first device, according to preference, from the set of secondary devices, to be the target device;
determine whether the target device is located;
responsive to a determination that the target device is not located, determine whether other secondary devices to try are available; and
responsive to a determination that there are no other secondary devices to try, continuing to monitor.

12. The data processing system of claim 7, wherein the processor unit executes the computer-executable instructions to direct the data processing system to forward a message to the target device further comprises:
determining whether to forward the message according to predetermined filters applicable to message forwarding;
responsive to the predetermined filters permitting the message to flow, forwarding the message; and
continuing to monitor the heartbeat of the mobile device.

13. A non-transitory computer usable storage medium storing a computer program product for programmatic message forwarding, the computer program product comprising:
computer-executable instructions for initiating a messaging session on a primary device;
computer-executable instructions for identifying device priority preferences for a set of secondary devices, the set of secondary devices includes a mobile device;
computer-executable instructions for monitoring for a presence of the mobile device with the primary device, the mobile device is present with the primary device when the mobile device and the primary device are in close physical proximity to each other,
the presence of the mobile device with the primary device is indicated as a heartbeat, and the heartbeat will be absent when the mobile device is not with the primary device;
a presence of the mobile device with the primary device indicates that a user is with the primary device, and further an absence of the heartbeat indicates that the user is not with the primary device;
computer-executable instructions responsive to a determination of the absence of the heartbeat, for identifying one of the set of secondary devices as a target device; and
computer-executable instructions responsive to locating the target device, for forwarding a message to the target device and;
ordering each secondary device in the set of secondary devices according to a sequence in which the secondary device is to be selected to receive a forwarded message, the order is determined by one or more of a type of message, an origin of message, a size of message, and a secondary device capability.

14. The non-transitory computer usable storage medium of claim 13, wherein computer-executable instructions for initiating a messaging session further comprises computer-executable instructions for pairing the primary device with a mobile device in the set of secondary devices.

15. The non-transitory computer usable storage medium of claim 13, wherein computer-executable instructions for identifying device priority preferences further comprises:
computer-executable instructions for ordering each secondary device in the set of secondary devices according to a sequence in which the secondary device is to be selected to receive a forwarded message, wherein the order is determined by one or more of a type of message, an origin of message, a size of message, and a secondary device capability.

16. The non-transitory computer usable storage medium of claim 13, wherein computer-executable instructions for monitoring for the presence of a mobile device further comprises:
computer-executable instructions for determining whether the heartbeat of the mobile device is detected; and
computer-executable instructions for responsive to determining the heartbeat is detected, continuing to monitor for the presence of the mobile device.

17. The non-transitory computer usable storage medium of claim 13, wherein computer-executable instructions responsive to a determination of the absence of the heartbeat, for identifying one of the set of secondary devices as a target device further comprises:
- computer-executable instructions for selecting a first device, according to preference, from the set of secondary devices, to be the target device;
- computer-executable instructions for determining whether the target device is located;
- computer-executable instructions responsive to a determination that the target device is not located, for determining whether other secondary devices to try are available;
- computer-executable instructions responsive to a determination that there are no other secondary devices to try, for continuing to monitor.

18. The non-transitory computer usable storage medium of claim 13, wherein computer-executable instructions for forwarding a message to the target device further comprises:
- computer-executable instructions for determining whether to forward the message according to predetermined filters applicable to message forwarding;
- responsive to the predetermined filters permitting the message to flow, forwarding the message; and
- continuing to monitor the heartbeat of the mobile device.

* * * * *